March 1, 1927.   E. L. MARTIN   1,619,356
WATER LEVEL CONTROLLING MEANS
Filed June 26, 1926   3 Sheets-Sheet 1
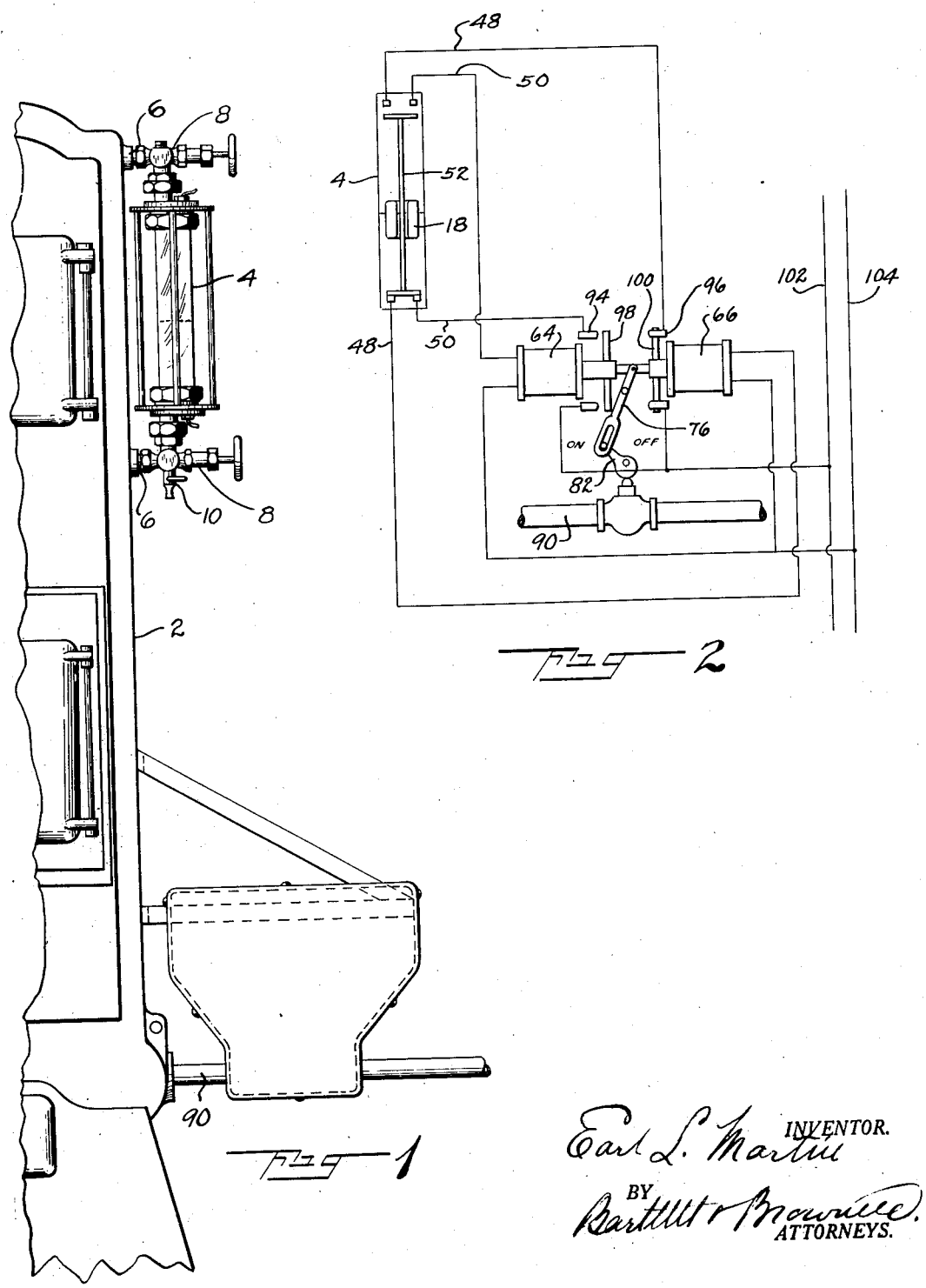

March 1, 1927.
E. L. MARTIN
1,619,356
WATER LEVEL CONTROLLING MEANS
Filed June 26, 1926    3 Sheets-Sheet 2
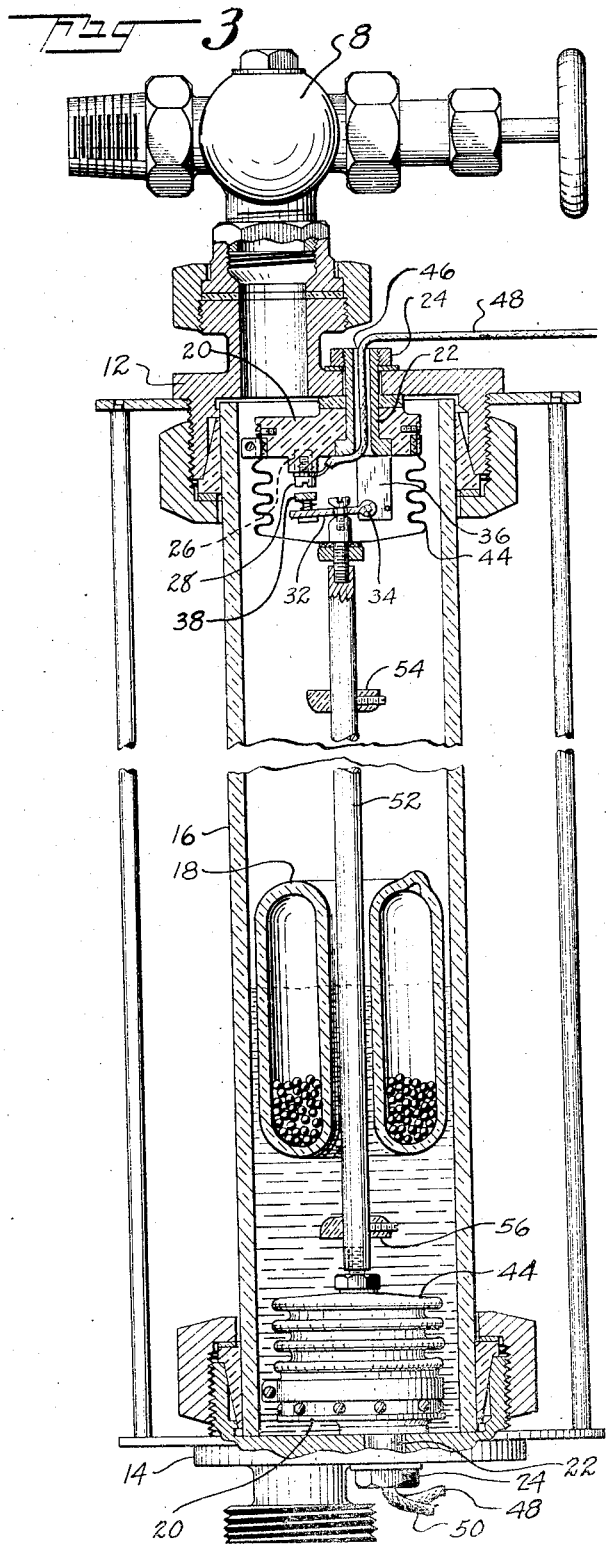
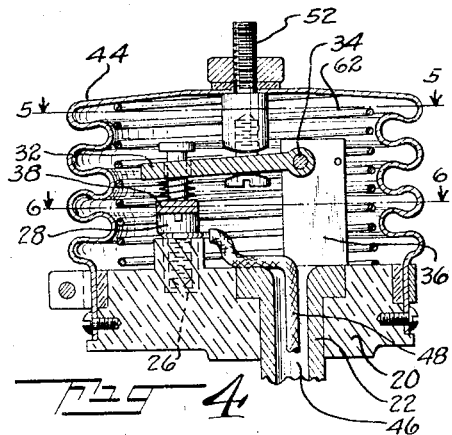
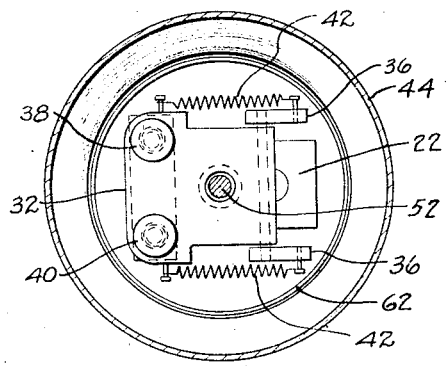
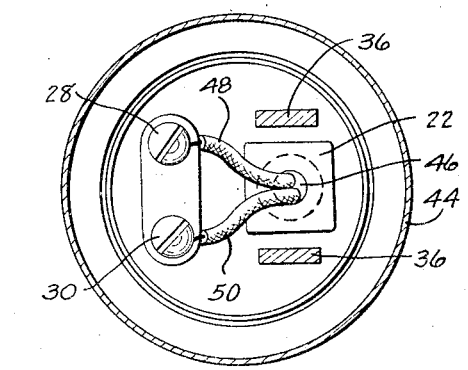

March 1, 1927. 1,619,356
E. L. MARTIN
WATER LEVEL CONTROLLING MEANS
Filed June 26, 1926 3 Sheets-Sheet 3

Earl Martin, INVENTOR.
BY Bartlett & Brownell, ATTORNEYS.

Patented Mar. 1, 1927.

1,619,356

UNITED STATES PATENT OFFICE.

EARL L. MARTIN, OF NEW YORK, N. Y.

WATER-LEVEL-CONTROLLING MEANS.

Application filed June 26, 1926. Serial No. 118,780.

My invention relates to water level controlling means and has for its object to provide a new and improved means for automatically controlling, within limits, the level of water within a steam boiler. It further has for its object to provide a water level controlling means comprising an electromagnetic device and circuit controlling means actuated by a float and protected from contact with the water which supports the float. It further has for its object to provide a water level controlling means comprising a gauge and having controlling switch mechanism actuated by a float and protected from moisture within the gauge by flexible means on which the boiler pressure thereon in one direction is balanced by boiler pressure in the other direction.

The following is a description of an embodiment of my invention reference being had to the accompanying drawings, in which:

Figure 1 shows a portion of a steam boiler in conjunction with my improved means;

Fig. 2 is a diagram of the same showing the electro-magnetic device and the circuits therefor;

Fig. 3 is an enlarged section of the gauge forming a portion of my improved means;

Fig. 4 is a still more enlarged section of the lower collapsible chamber and switch preferably employed in carrying out my invention;

Fig. 5 is a section on the line 5—5, Fig. 4;

Fig. 6 is a section on the line 6—6, Fig. 4;

Figure 7:
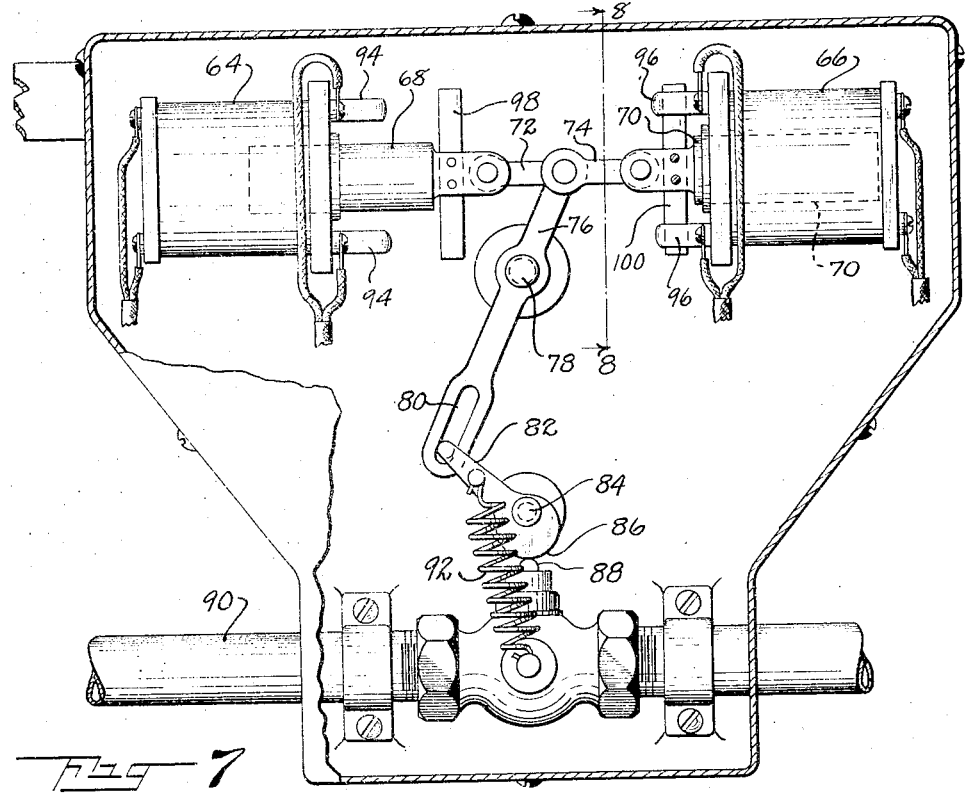
Fig. 7 shows the electro-magnetic device with a portion of its housing removed.
Figure 8:
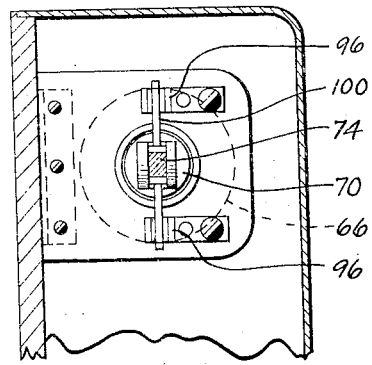
Fig. 8 is a section on the line 8—8, Fig. 7.

Referring more particularly to the drawings, 2 is a steam boiler having a water gauge 4 specially designed for use in carrying out my invention, connected thereto at 6 in the ordinary manner, valves 8 being provided for shutting off the connection to the gauge if desired, and also a petcock 10 for draining the gauge, if desired.

My improved gauge consists of headers 12 and 14 in which is mounted a tube 16, preferably transparent, large enough to contain a float 18 of glass or other non-corroding material having sufficient weight and buoyancy to actuate the gauge switch mechanism hereinafter referred to. Within each header is a base 20 of bakelite or other insulating material having molded therein a metallic bushing 22 which passes through the header and is secured in place by a nut 24. Attached to each base 20 and surrounding said switch is a collapsible wall 44 forming a yielding portion of the gauge chamber wall, the two portions being one above the other on opposite sides respectively of the gauge chamber. These yielding portions have their outer sides exposed to the atmosphere through the port 46 passing through the bushing 22 so that the pressure therein is the same as atmospheric pressure. Connected to the upper and lower flexible portions, respectively, is a rod 52 made of some non-corroding material which passes through the float 18 and is provided with adjustable stops 54 and 56 coacting with the float 18. In the construction shown the yielding portions constitute two supplemental chambers.

With this construction the pressure within the two supplemental chambers 44 is always atmospheric pressure and the boiler pressure which is exerted upon one flexible portion is balanced by the boiler pressure exerted on the other flexible portion. One of the supplemental chambers, preferably the lower one, has a spring, shown in Fig. 4 as a compression spring 62 which substantially balances the weight of the rod 52 and the parts connected thereto.

With this arrangement when the water falls to a point where the weight of the float 18 rests sufficiently upon the stop 56, the rod will be lowered and when the water rises so that the float 18 exerts sufficient pressure on the stop 54, the rod will be raised.

The float 18 in its movements actuates the rod 52 connecting movable parts of a double throw switch mechanism whose two circuits control an electro-magnetic water-supply controlling device. Instead of embodying my invention by using a double throw switch located adjacent to one of the yielding portions 44, I preferably, for the sake of simplicity and uniformity of parts, use two single throw switches, as shown, one adjacent to each of said yielding portions and connected by the rod 52 so as together constitute a double throw switch mechanism. I also preferably locate these single throw switches within the supplemental chambers. In doing this I make the yielding portions 44 in the form of bellows and provide each base 20 with inserts 26 having binding screws 28 and 30 which binding screws serve as switch contacts, with which cooperate switch arms 32 pivotally supported at 34 upon supports 36 also molded into said base. These switch arms have spring terminals 38 and 40 adapted to engage with the contacts 28 and 30 and are held on one side or the other of the dead center by springs 42 connected thereto and to the supports 36, which insure proper electrical engagement between each switch arm and the contacts with which it cooperates.

The connections between the rod 52 and the switch arms are lost motion connections but are such that if one switch arm is actuated the other is also actuated so that both switch arms are never in closed position at the same time.

The switch mechanism being outside the main chamber wall is protected from the water and moisture within the gauge.

Conductors connecting the switch contacts 28 and 30 with the electro-magnetic device pass through the ports 46 as indicated at 48 and 50.

Connected to the contacts of the upper and lower switches, respectively, are solenoids 64 and 66 of an electro-magnetic device having cores 68 and 70 connected to each other by links 72 and 74, and to a lever 76 pivoted at 78. The lower end of this lever has a slot 80 in which plays a pin carried by the end of a lever 82 pivoted at 84 and having a cam 86 for actuating a valve stem 88 or other device for controlling the water supply through the inlet 90. A spring 92 connected to the lever 82 throws that lever in one direction or the other after it has been caused to pass its dead center by the action of either solenoid 64 or 66, and also acts to cause the solenoid cores to make a complete throw when the dead center has been passed. The solenoid cores carry contacts 94 and 96, respectively, which are engaged and disengaged by switch arms 98 and 100, the switch arm 100, when open, locally opening the energizing circuit through the solenoid 64 and the switch arm 98, when open, acting to locally open the energizing circuit through the solenoid 66, after the respective solenoids have completed their function. The solenoid 64, contacts 96 and switch arm 100, as shown by the diagram, Fig. 2, are in series with the contacts of the switch adjacent to the upper end of the gauge, and the solenoid 66, contacts 94 and switch arm 98, are in series with the contacts of the switch adjacent to the lower end of the gauge. 102 and 104 are the mains supplying current.

With the arrangement above described, when the water level in the boiler falls sufficiently, the float 18 causes the switch at the lower end of the gauge to close, energizing the solenoid 64 (whose circuit is at that time closed locally by the switch arm 100) and causing that solenoid to actuate the lever 82 to turn on the water, and subsequently, after it has performed its function separating the switch arm 100 from the contacts 96 so as to locally open the circuit through the solenoid 64. On account of this local opening there is never any break of the current at the switch at the upper end of the gauge so that there is no sparking or burning of the contacts of that switch.

When the water rises to the desired level the float causes the switch at the upper end of the gauge glass to close, energizing the solenoid 66 which acts to shut off the water and locally open its circuit at the contacts 94 after it has completed its function, thus preventing sparking at the switch adjacent to the lower end of the gauge.

This arrangement is reliable so long as there is sufficient current supply and for that reason is particularly adapted for use in connection with domestic boilers equipped with oil burners which have electrically actuated fans, in which when the current fails the fire ceases. The water level controller being connected to the same mains as the actuating fan for the oil burner, current is always present when the oil burner is operating, thus insuring against too little water in the boiler at any time.

While it is possible that the current might fail during a period when the water is turned on, that would simply result in an over-supply of water and not result in any injury to the system, the thing to be avoided being lack of water and consequent burning of the boiler when the heating system is in operation.

Although I have shown my invention in connection with a water supply, controlled by a simple valve, it is obvious that it could be equally well applied to larger installations where either steam pumps or electric pumps are used for the introduction of water into the boiler, in which case the electro-magnetic device would control a steam valve for starting and stopping the steam pump, or another switch for the electric pump.

Inasmuch as the pressure within the gauge upon the collapsible chambers is balanced, variations in pressure such as are liable to occur within a boiler do not affect the operation of the device and the device can be used in connection with boilers of different pressures, the strength of the parts being varied as the pressures used may determine.

As will be evident to those skilled in the art, my invention permits various modifications without departing from the spirit thereof or the scope of the appended claims.

What I claim is:

1. In an apparatus for controlling the level of water within a steam boiler, the combination of a chamber connected to the boiler having at the top and bottom portions thereof, respectively, yielding wall portions, a vertical member connecting said yielding wall portions so that the boiler pressure thereon is balanced, a float adapted to move said connecting member upwardly and downwardly as the water rises and falls, switch mechanism on the exterior of said chamber actuated by said float through said movable member, and two circuits alternately opened and closed by said switch mechanism and water supply controlling means actuated by said circuits.

2. In an apparatus for controlling the level of water within a steam boiler, the combination of a chamber connected to the boiler having at the top and bottom portions thereof, respectively, yielding wall portions, a vertical member connecting said yielding wall portions so that the boiler pressure thereon is balanced, a float adapted to move said connecting member upwardly and downwardly as the water rises and falls, switch mechanism on the exterior of said chamber actuated by said float through said movable member, and two circuits alternately opened and closed by said switch mechanism, said switch mechanism comprising a switch arm and coacting contacts located above said upper yielding portion, and the second switch arm and coacting contacts located below said lower yielding portion and water supply controlling means actuated by said circuits.

3. In an apparatus for controlling the level of water within a steam boiler, the combination of a chamber connected to the boiler having at the top and bottom portions thereof, respectively, yielding wall portions, a vertical member connecting said yielding wall portions so that the boiler pressure thereon is balanced, a float adapted to move said connecting member upwardly and downwardly as the water rises and falls, switch mechanism on the exterior of said chamber actuated by said float through said movable member, two circuits alternately opened and closed by said switch mechanism, and an electro-magnetic device controlled by said circuits respectively, and acting to control the water supply to said boiler and comprising means for opening either circuit, when energized, after the electro-magnetic device has performed its function.

4. In an apparatus for controlling the level of water within a steam boiler, the combination of a chamber connected to the boiler having at the top and bottom portions thereof, respectively, yielding wall portions, a vertical member connecting said yielding wall portions so that the boiler pressure thereon is balanced, a float adapted to move said connecting member upwardly and downwardly as the water rises and falls, switch mechanism on the exterior of said chamber actuated by said float through said movable member, two circuits alternately opened and closed by said switch mechanism, said switch mechanism comprising a switch arm and coacting contacts located above said upper yielding portion and a second switch arm and coacting contacts located below said lower yielding portion, and an electro-magnetic device controlled by said circuits respectively and acting to control the water supply of said boiler and comprising means for opening either circuit when energized after the electro-magnetic device has performed its function.

5. In an apparatus for controlling the level of water within a steam boiler, the combination of a chamber connected to the boiler having at the top and bottom portions thereof, respectively, yielding wall portions, a vertical member connecting said yielding wall portions so that the boiler pressure thereon is balanced, a float adapted to move said connecting member upwardly and downwardly as the water rises and falls, switch mecahnism on the exterior of said chamber actuated by said float through said movable member, and two circuits, alternately opened and closed by said switch mechanism, the outer sides of said yielding portions being exposed to atmospheric pressure and water supply controlling means actuated by said circuits.

6. In an apparatus for controlling the level of water within a steam boiler, the combination of a chamber connected to the boiler having at the top and bottom portions thereof, respectively, yielding wall portions a vertical member connecting said yielding wall portions so that the boiler pressure thereon is balanced, a float adapted to move said connecting member upwardly and downwardly as the water rises and falls, switch mechanism on the exterior of said chamber actuated by said float through said movable member, two circuits alternately opened and closed by said switch mechanism, said switch mechanism comprising a switch arm and coacting contacts located above said upper yielding portion and a second switch arm and coacting contacts located below said lower yielding portion, and an electro-magnetic device controlled by said circuits respectively and acting to control the water supply of said boiler and comprising means for opening either circuit when energized after the electro-magnetic device has performed its function, said yielding portions being in the form of bellows.

In testimony whereof, I have signed my name to this specification this 25th day of June, 1926.

EARL L. MARTIN.